United States Patent
Pan et al.

(10) Patent No.: US 12,014,549 B2
(45) Date of Patent: Jun. 18, 2024

(54) SYSTEMS AND METHODS FOR VEHICLE LIGHT SIGNAL CLASSIFICATION

(71) Applicant: Toyota Research Institute, Inc., Los Altos, CA (US)

(72) Inventors: Jia-En Pan, Mountain View, CA (US); Kuan-Hui Lee, San Jose, CA (US); Chao Fang, Sunnyvale, CA (US); Kun-Hsin Chen, Mountain View, CA (US); Arjun Bhargava, San Francisco, CA (US); Sudeep Pillai, Santa Clara, CA (US)

(73) Assignee: Toyota Research Institute, Inc., Los Altos, CA (US)

(*) Notice: Subject to any disclaimer, the term of this patent is extended or adjusted under 35 U.S.C. 154(b) by 212 days.

(21) Appl. No.: 17/192,443

(22) Filed: Mar. 4, 2021

(65) Prior Publication Data
US 2022/0284222 A1    Sep. 8, 2022

(51) Int. Cl.
*G06V 20/56* (2022.01)
*B60R 11/04* (2006.01)
(Continued)

(52) U.S. Cl.
CPC .............. *G06V 20/56* (2022.01); *B60R 11/04* (2013.01); *G06T 3/0093* (2013.01); *G06T 7/337* (2017.01);
(Continued)

(58) Field of Classification Search
CPC ... G06V 20/56; B60R 11/04; B60R 2300/303; G06T 3/0093; G06T 7/337;
(Continued)

(56) References Cited

U.S. PATENT DOCUMENTS 9,002,055 B2   4/2015  Funayama et al.
10,061,322 B1  8/2018  Palefsky-Smith
(Continued)

FOREIGN PATENT DOCUMENTS

CN    106845453 A     6/2017
JP    6908445 B2 *    7/2021    ............... G06T 7/00
(Continued)

OTHER PUBLICATIONS

Lee, K.H., Tagawa, T., Pan, J.E.M., Gaidon, A. and Douillard, B., Jun. 2019. An attention-based recurrent convolutional network for vehicle taillight recognition. In 2019 IEEE Intelligent Vehicles Symposium (IV) (pp. 2365-2370). IEEE.*
(Continued)

*Primary Examiner* — Zhitong Chen
(74) *Attorney, Agent, or Firm* — Christopher G. Darrow; Darrow Mustafa PC (57) ABSTRACT

A vehicle light classification system captures a sequence of images of a scene that includes a front/rear view of a vehicle with front/rear-side lights, determines semantic keypoints, in the images and associated with the front/rear-side lights, based on inputting the images into a first neural network, obtains multiple difference images that are each a difference between successive images from among the sequence of images, the successive images being aligned based on their respective semantic keypoints, and determines a classification of the front/rear-side lights based at least in part on the difference images by inputting the difference images into a second neural network.

20 Claims, 5 Drawing Sheets

(51) Int. Cl.
*G06T 3/00* (2006.01)
*G06T 7/33* (2017.01)

(52) U.S. Cl.
CPC .................. *B60R 2300/303* (2013.01); *G06T 2207/20084* (2013.01); *G06T 2207/20221* (2013.01); *G06T 2207/30252* (2013.01)

(58) Field of Classification Search
CPC . G06T 2207/20084; G06T 2207/20221; G06T 2207/30252
See application file for complete search history.

(56) References Cited

U.S. PATENT DOCUMENTS

| | | | |
|---|---|---|---|
| 10,248,874 | B2 | 4/2019 | Moosaei et al. |
| 10,471,955 | B2 | 11/2019 | Kouri et al. |
| 10,691,692 | B2 | 6/2020 | Hu |
| 11,328,519 | B2 | 5/2022 | Hsiao et al. |
| 2018/0192035 | A1 | 7/2018 | Dabeer et al. |
| 2019/0087672 | A1 | 3/2019 | Wang et al. |
| 2019/0092318 | A1* | 3/2019 | Mei ...................... G06V 20/584 |
| 2019/0329769 | A1 | 10/2019 | Shalev-Shwartz et al. |
| 2020/0098135 | A1 | 3/2020 | Ganjineh et al. |
| 2020/0353932 | A1 | 11/2020 | Wang et al. |
| 2021/0209797 | A1* | 7/2021 | Lee ......................... G06T 17/00 |

FOREIGN PATENT DOCUMENTS

| | | |
|---|---|---|
| JP | 6908445 B2 | 7/2021 |
| WO | 2020048265 A1 | 12/2020 |

OTHER PUBLICATIONS

López, J.G., Agudo, A. and Moreno-Noguer, F., Sep. 2019. Vehicle pose estimation via regression of semantic points of interest. In 2019 11th International Symposium on Image and Signal Processing and Analysis (ISPA) (pp. 209-214). IEEE (López).*

Wei, L., Xu, C., Li, S. and Tu, X., 2020. Traffic sign detection and recognition using novel center-point estimation and local features. IEEE Access, 8, pp. 83611-83621 (Wei).*

Lopez et al., "Vehicle pose estimation via regression of semantic points of interest," 2019 11th International Symposium on Image and Signal Processing and Analysis (ISPA), 6 pages.

Murthy et al., "Shape Priors for Real-Time Monocular Object Localization in Dynamic Environments," 2017 IEEE/RSJ International Conference on Intelligent Robots and Systems (IROS), 7 pages.

Li et al., "Recognizing Car Fluents from Video," arXiv:1603.08067v1 [cs.CV] Mar. 26, 2016 (15 pages).

Ding et al., "Vehicle Pose and Shape Estimation through Multiple Monocular Vision," rXiv:1802.03515v5 [cs. CV] Nov. 11, 2018 (7 pages).

Lee et al., "An Attention-based Recurrent Convolutional Network for Vehicle Taillight Recognition," arXiv:1906.03683v1 [cs.CV] Jun. 9, 2019 (6 pages).

Yoneda et al., "Robust Traffic Light and Arrow Detection Using Digital Map with Spatial Prior Information for Automated Driving," Sensors 2020, 20, 1181, pp. 1-24.

Chen et al., "Accurate and Reliable Detection of Traffic Lights Using Multiclass Learning and Multiobject Tracking," IEEE Intelligent Transportation Systems Magazine, 15 pages (2016).

John et al., "Traffic Light Recognition in Varying Illumination using Deep Learning and Saliency Map," 17th International IEEE Conference on Intelligent Transportation Systems (ITSC), Qingdao, 2014, pp. 2286-2291.

Fairfield et al., "Traffic Light Mapping and Detection," Proceedings—IEEE International Conference on Robotics and Automation, 6 pages (2011).

Lu et al., "Traffic Signal Detection and Classification in Street Views Using an Attention Model," vol. 4, No. 3, Sep. 2018, 253-266.

Non-Final Office Action for U.S. Appl. No. 17/130,435, dated Nov. 7, 2022, 16 pages.

Duan et al., "CenterNet: Keypoint Triplets for Object Detection," Proceedings of the IEEE/CVF International Conference on Computer Vision (ICCV), 2019, pp. 6569-6578.

Eteifa et al., "Predicting Coordinated Actuated Traffic Signal Change Times using LSTM Neural Networks," arXiv:2008.08035, 2020, pp. 1-17.

Final Office Action for U.S. Appl. No. 17/130,435, dated Mar. 22, 2023, 22 pages.

Wei et al., "Traffic Sign Detection and Recognition Using Novel Center-Point Estimation and Local Features," IEEE Access, vol. 8, 2020, pp. 83611-83621.

Notice of Allowance for U.S. Appl. No. 17/130,435, dated May 12, 2023, 13 pages.

Final Office Action for U.S. Appl. No. 17/192,443, dated Mar. 22, 2023, 15 pages.

* cited by examiner

SYSTEMS AND METHODS FOR VEHICLE LIGHT SIGNAL CLASSIFICATION

TECHNICAL FIELD

The subject matter described herein relates, generally, to systems and methods for classifying vehicle light signals, and more particularly, to systems and methods that use semantic keypoints to localize vehicle turn and brake light signal locations to improve classification accuracy.

BACKGROUND

Functioning light signals (e.g., turn signals and brake signals) are a legally required component for motor vehicles operated on public roadways. For example, the status of the rear-side light signals on a vehicle can help communicate an intention of a driver in a preceding vehicle. For an autonomous vehicle control system, accurately identifying and classifying the status of the rear-side light signals of a preceding vehicle can be critical in improving autonomous maneuvering decision-making algorithms, as well as providing vehicle driving assistance. Conventional methods for classifying vehicle rear-side lights can use algorithms such as optical flow and SIFT flow for tracking bounding boxes across multiple images. However, these approaches have a relatively high computational cost. Furthermore, the conventional bounding box analysis may not be precise enough to support autonomous system decision-making in the specialized task of rear-side light classification.

SUMMARY

The disclosed apparatuses, methods and systems relate to a vehicle light signal classification system that can identify and classify the status of vehicle light signals, including brake lights and turn signals.

In one embodiment, the disclosed light signal classification system includes an image capture device to capture a sequence of images of a scene that includes a front/rear view of a vehicle with front/rear-side lights. The system further includes a memory, communicably coupled to a processor, storing: a semantic keypoint module including instructions that when executed by the processor cause the processor to determine semantic keypoints, in the images and associated with the front/rear-side lights, based on inputting the images into a first neural network, and a classification module including instructions that when executed by the processor cause the processor to: 1) obtain difference images that are each a difference between successive images from among the sequence of images, the successive images being aligned based on their respective semantic keypoints, and 2) determine a classification of the front/rear-side light based at least in part on the difference images by inputting the difference images into a second neural network.

In one embodiment, a method of classifying a vehicle light signal includes capturing a sequence of images of a scene that includes a front/rear view of a vehicle with front/rear-side lights, determining semantic keypoints, in the images and associated with the front/rear-side lights, based on inputting the images into a first neural network, obtaining difference images that are each a difference between successive images from among the sequence of images, the successive images being aligned based on their respective semantic keypoints, and determining a classification of the front/rear-side lights based at least in part on the difference images by inputting the difference images into a second neural network.

In one embodiment, a non-transitory computer-readable medium for classifying vehicle lights includes instructions that, when executed by a processor, causes the processor to capture a sequence of images of a scene that includes a front/rear view of a vehicle with front/rear-side lights, determine semantic keypoints, in the images and associated with the front/rear-side lights, based on inputting the images into a first neural network, obtain difference images that are each a difference between successive images from among the sequence of images, the successive images being aligned based on their respective semantic keypoints, and determine a classification of the front/rear-side lights based at least in part on the difference images by inputting the difference images into a second neural network.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improved vehicle light signal detection and classification are disclosed. As described herein, a vehicle light can be any of multiple types of "light signals" (e.g., a red-light brake signal, yellow-light turn signal, etc.) that are disposed on a vehicle. The light signals can face a forward direction or a rear direction of the vehicle and can be used for indicating an intended or current vehicle maneuver, such as slowing down, stopping, or turning. The disclosed embodiments can be applied to rear-side vehicle light signals (i.e., of a preceding vehicle) or similarly to front-side vehicle light signals (i.e., of a trailing vehicle). For simplicity of description, the disclosed embodiments will be discussed below primarily regarding an implementation that classifies rear-side vehicle signal lights of a preceding vehicle. It should be understood by one of ordinary skill in the art that the disclosed embodiments can similarly be applied to front-side vehicle light signals of a trailing vehicle.

In the spatial domain, conventional rear-side light detection systems may attempt to detect rear-side light signal states by using color thresholds to train a classifier to detect rear-side light signals (e.g., turn signals) and then use reflective contrast to determine a direction of the signal. Other conventional systems may use object detection to determine a bounding box localizing a region of interest including rear-side lights and train a classifier to determine a rear-side light signal based on the bounding box data. In the temporal domain, conventional rear-side light detection systems may utilize high computational cost algorithms such as optical flow algorithms or SIFT flow algorithms to align consecutive frames, determine a difference between the aligned frames and extract temporal information regarding the rear-side light from the difference.

In contrast to the conventional detection techniques, the disclosed embodiments detect each individual vehicle light using semantic keypoints first to better localize front/rear-side light signal (e.g., turn and brake signal) locations on vehicles before attempting to classify an activation state of the individual light signals. In addition to lowering computational costs, the disclosed embodiments disentangle representations that specifically pertain to the relevant task while learning a representation for a light signal activation. The directed detection and description of specific, semantically relevant keypoints on light signals provide a stronger signal for accurate bulb activation classification and improve the speed and accuracy of the detection/classification process.

Figure 1:
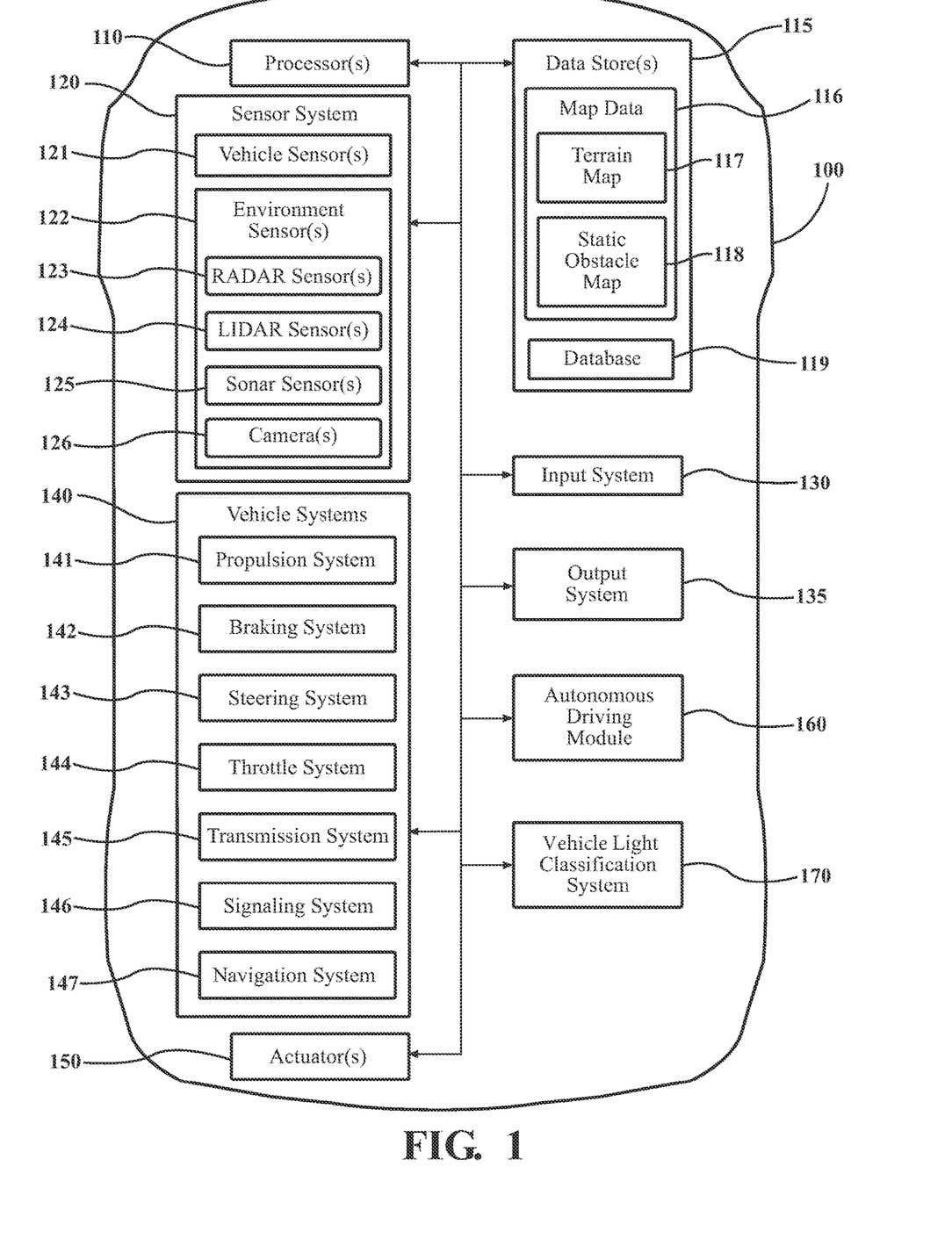
FIG. 1 illustrates one embodiment of a vehicle within which embodiments disclosed herein may be implemented.

Referring to FIG. 1, an example of a vehicle 100 is illustrated. As used herein, a "vehicle" is any form of transport that is used for moving people, animals, goods, or the like. In one or more implementations, the vehicle 100 is an automobile. While arrangements will be described herein generally with respect to automobiles, it should be understood that the scope of the disclosed subject matter is not limited to automobiles. In some implementations, the vehicle 100 may be any form of powered, multi-wheeled transport or vehicle that may be required to identify and classify a rear-side light of a preceding vehicle (or multiple preceding vehicles) and thus can benefit from the functionality discussed herein.

As shown in FIG. 1, the vehicle 100 includes multiple elements. It should be understood that in various embodiments the vehicle 100 may not necessarily include all of the elements shown in FIG. 1. The vehicle 100 can have any combination of the various elements shown in FIG. 1. Further, the vehicle 100 can have other elements in addition to those shown in FIG. 1. In some arrangements, the vehicle 100 may be implemented without one or more of the elements shown in FIG. 1. While the various elements are shown as being located within the vehicle 100 in FIG. 1, it should be understood that one or more of these elements can be located external to the vehicle 100. Further, the elements shown may be physically separated by large distances.

Some of the possible elements of the vehicle 100 are shown in FIG. 1 and will be described along with subsequent figures. However, a more detailed description of many of the elements in FIG. 1 will be provided after the discussion of FIGS. 2-7 for purposes of brevity in this description. For simplicity and clarity of illustration, where appropriate, reference numerals have been repeated among the different figures to indicate corresponding or analogous elements. In addition, while the discussion outlines numerous specific details to provide a thorough understanding of the embodiments described herein, those of ordinary skill in the art will understand that the embodiments described herein may be practiced using various combinations of these elements.

In any case, the vehicle 100 includes a rear-side (or front-side) vehicle light classification system 170 that is implemented to perform methods and other functions as disclosed herein relating to detecting and classifying rear-side lights of a preceding vehicle that the vehicle 100 may be approaching, or similarly, front-side lights of a trailing vehicle. The noted functions and methods will become more apparent in the following discussion of the figures.

Figure 2:
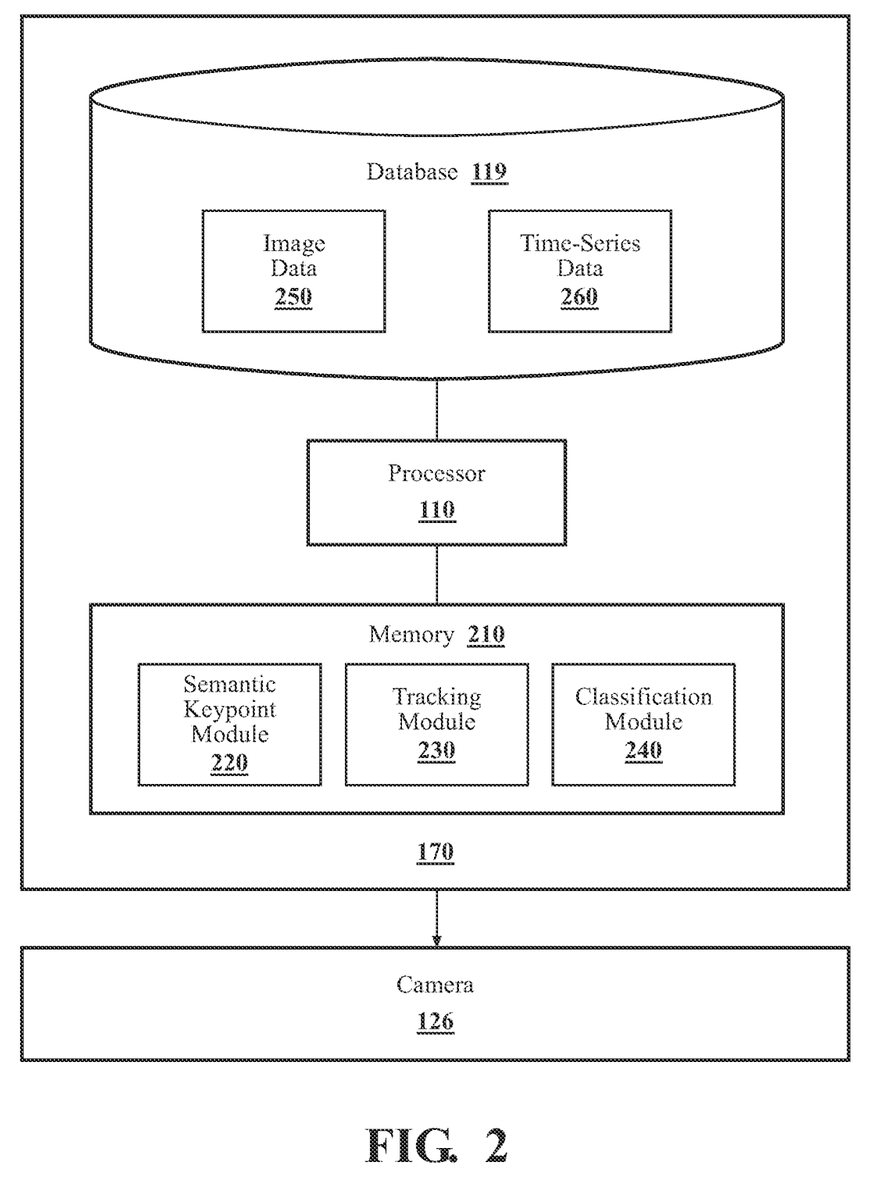
FIG. 2 illustrates one embodiment of a rear-side light classification system according to the disclosed subject matter.

With reference to FIG. 2, one embodiment of an implementation of the vehicle light classification system 170 of FIG. 1 is illustrated. The vehicle light classification system 170 is shown as including a processor 110 and database 119 from the vehicle 100 of FIG. 1. Accordingly, the processor 110 may be a part of the vehicle light classification system 170, the vehicle light classification system 170 may include a processor separate from the processor 110 of the vehicle 100 or the vehicle light classification system 170 may access the processor 110 through a data bus or another communication path.

The system 170 can receive one or more images from a camera 126, for example, a camera that is part of a sensor system 120 of the vehicle 100. The camera 126 can capture a sequence of images of a scene (e.g., around the vehicle 100) that includes one or more preceding vehicles with rear-side lights facing the direction of the vehicle 100 (or similarly, one or more trailing vehicles with front-side lights facing the direction the vehicle 100, etc.).

The vehicle light classification system 170 includes a database 119 that stores, among other things, image data 250 (e.g., sequence of images captured by the camera 126) and time-series data 260 (e.g., feature vectors determined from the image data 250), as will be discussed further below. The database 119, in one embodiment, is constructed as an electronic data structure stored in the memory 210 or another data store, such as the vehicle 100 data store 115, a cloud-based storage, a removable memory device, or another suitable location that is accessible to the modules 220, 230, and 240. The database 119 is configured with routines that can be executed by the processor 110 for analyzing stored data, providing stored data, organizing stored data, and so on. Thus, in one embodiment, the database 119 stores data described above (as well as other data) used by the modules 220, 230, and 240 in executing various functions.

Additionally, the vehicle light classification system 170, in one or more embodiments, includes a memory 210 that stores a semantic keypoint module 220, a tracking module 230, and a classification module 240. The memory 210 can be constructed as a random-access memory (RAM), read-only memory (ROM), a hard-disk drive, a flash memory, or other suitable memory for storing the modules 220, 230 and 240.

The modules 220, 230 and 240 are, for example, constructed as computer-readable instructions that when executed by the processor 110 cause the processor 110 to perform the various functions disclosed herein.

The semantic keypoint module 220 is generally constructed including instructions that function to control the processor 110 to determine semantic keypoints associated with vehicle lights captured in an image (e.g., image data 250) by inputting the image into a first neural network. A 'semantic keypoint' as used herein refers to a specific point of interest with semantic meaning for an object in an image. In one or more embodiments, the semantic keypoint corresponds to a single pixel in the image. In one or more embodiments, the first neural network implements a deep neural network including a convolution neural network (CNN) layer that can output confidence heatmaps which indicate a confidence level of a classification state for a semantic keypoint.

In one or more embodiments, the neural network can generate a feature vector associated with each semantic keypoint. In one or more embodiments, the feature vector is a multi-dimensional array that describes the semantic keypoint and/or the pixel that the semantic keypoint corresponds to.

The tracking module 230 is generally constructed including instructions that function to control the processor 110 to track semantic keypoints associated with specific vehicle light signals across a sequence of images from image data 250. For example, in one or more embodiments the tracking module 230 includes instructions to define a bounding box based on semantic keypoints associated with rear-side lights of a single vehicle and track the bounding box across the sequence of images. In one or more embodiments, an image can include multiple vehicles, the tracking module 230 can define a separate bounding box for each vehicle detected in the image and track (e.g., consistently maintain) each separate bounding box across the sequence of images.

The classification module 240 is generally constructed including instructions that function to control the processor 110 to: 1) obtain multiple difference images that are each a difference between successive images (e.g., from image data 250) that are aligned based on their respective semantic keypoints, and 2) determine a classification of the front/rear-side lights captured in the images based at least in part on the difference images by inputting the difference images into a second neural network. In one or more embodiments, the classification module 240 implements the second neural network as a deep neural network including a convolutional neural network (CNN) layer that generates feature vectors based on the difference images and a long short-term memory (LSTM) layer that generates the classification based on the feature vectors. In one or more embodiments, the classification module 240 obtains the difference images based on a portion of the image that falls within a bounding box defined by the tracking module 230.

Figure 3:
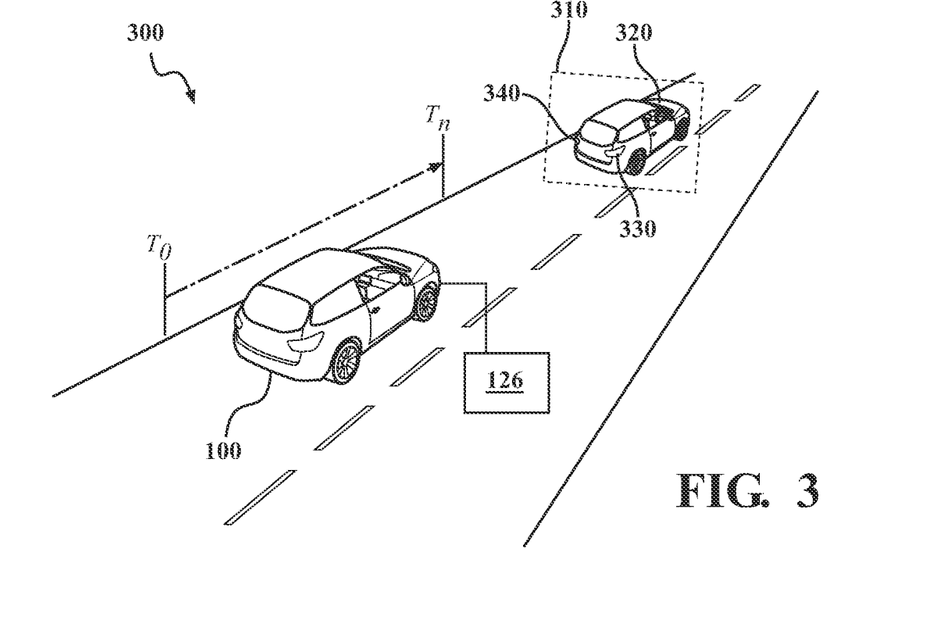
FIG. 3 illustrates an example scenario of the disclosed rear-side light classification system, according to the disclosed subject matter.

FIGS. 1-3 show an example scenario 300 of the disclosed vehicle light classification system 170. The vehicle 100 is shown approaching a preceding vehicle 320 that has rear-side light signals 330, 340 facing toward the vehicle 100. In this example, the rear-side light signals include a red-light brake signal 330 and a yellow-light turn signal 340. To simplify explanation, one preceding vehicle 320 is shown. It should be understood, however, that the disclosed embodiments are applicable to other scenarios, for example, including multiple preceding vehicles or similarly multiple trailing vehicles.

The camera 126 can capture an image 310 of a scene around the vehicle, with the image 310 including the preceding vehicle 320. In one or more embodiments, the camera 126 can capture a plurality of images over a period of time, e.g., from time $T_0$ to $T_n$, at a predetermined frequency, e.g., 10 hz. The system 170 can store the one or more images as image data 250.

The vehicle light classification system 170 (e.g., semantic keypoint module 220) can input the image 310 into a neural network. In one or more embodiments, the neural network is a convolutional neural network (CNN) trained to localize each rear-side light signal in an image, determine a semantic keypoint for each light signal, and determine a classification for each semantic keypoint. In one or more embodiments, the classification identifies one or more characteristics of a state of the rear-side light signal, e.g., on/off, color, shape, etc. For example, the neural network can classify a semantic keypoint as a red brake light that is on, or a yellow turn signal that is off, etc.

In one or more embodiments, the neural network can attempt to classify each pixel in the image and output heat maps that indicate a confidence level of a classification for each semantic keypoint in the image. In one or more embodiments, the vehicle light classification system 170 can select a semantic keypoint that that has a highest confidence level for a light signal classification. Thus, each semantic keypoint has a classification and a position in the image corresponding to a specific pixel. In one or more embodiments, a semantic keypoint can correspond to a cluster of pixels within a region of interest (ROI).

Figure 4:
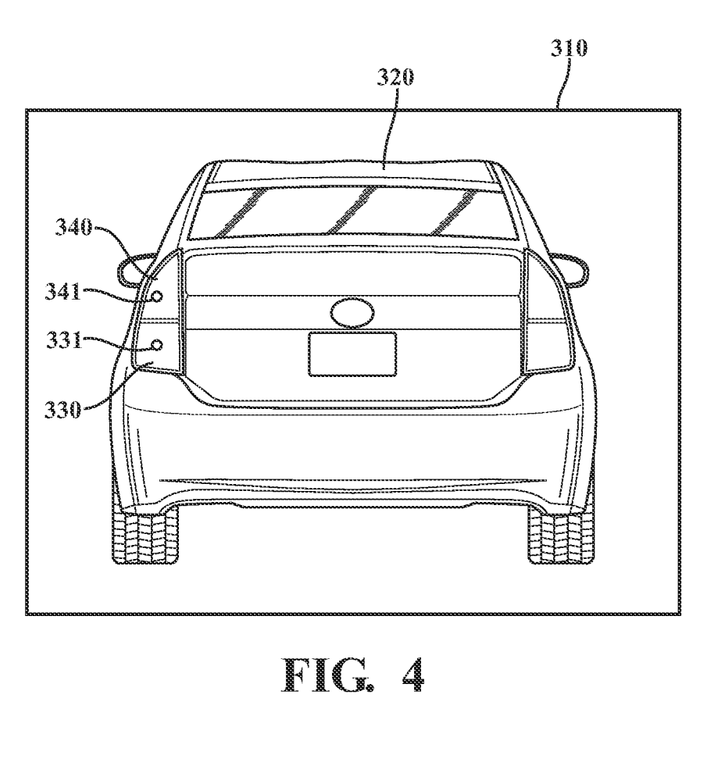
FIG. 4 illustrates an example image including a rear-view of a preceding vehicle and semantic keypoints, according to the disclosed subject matter.

FIG. 4 shows an example image 310 including the preceding vehicle 320. For each rear-side light signal (e.g., red-light brake signal 330 and yellow-light turn signal 340), the neural network outputs a corresponding semantic keypoint (e.g., 331, 341). In one or more embodiments, the semantic keypoints 331, 341 each correspond to a pixel in the image 310.

In one or more embodiments, the disclosed vehicle light classification system 170 can use time-series data and temporal analysis to determine a rear-side light signal classification. To execute the temporal analysis, as previously mentioned the camera 126 can capture a series of images over a period of time, e.g., from $T_0$ to $T_n$. For example, the camera 126 can capture images at a frequency of at least 5 Hz. In one or more embodiments, the camera 126 can capture images at a frequency of 10 Hz.

FIGS. 1-5 show an example sequence of images 500. The vehicle light classification system 170 (e.g., semantic keypoint module 220) can determine a semantic keypoint 331a (and its associated classification and feature vector) for a rear-side light signal 330a in an image and similarly in each image in the sequence of images 500 for other rear-side light signals in the sequence of images 500. The semantic keypoint module 220 can store the classifications and feature vectors as part of the time-series data 260.

Figure 5:
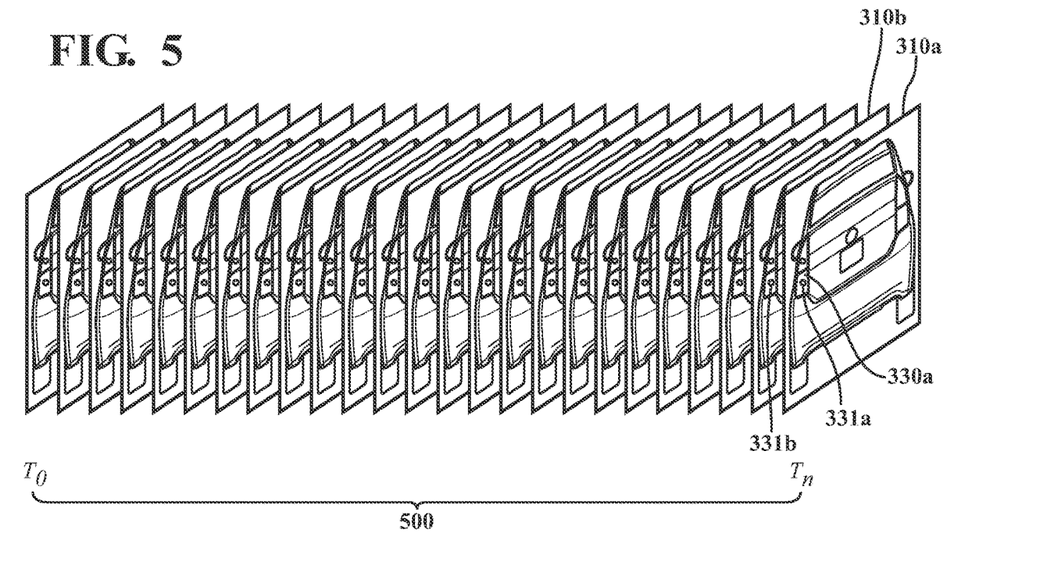
FIG. 5 illustrates an example sequence of images, according to the disclosed subject matter.

The vehicle light classification system 170 (e.g., tracking module 230) can track a rear-side light signal across a sequence of images. In one or more embodiments the tracking module 230 can track a rear-side light signal based at least in part on the feature vectors. For example, the tracking module 230 can compare a first set of feature vectors associated with semantic keypoint 331a against a second set of feature vectors associated with semantic keypoint 331b. The tracking module 230 can determine that the two keypoints represent the same keypoint in different images when the comparison shows that the two sets of feature vectors exceed a similarity threshold.

In one or more embodiments, the tracking module 230 can define a bounding box around a group of rear-side light signals on a single vehicle based on the locations of semantic keypoints associated with the group of rear-side light signals. The tracking module 230 can track a position of the single vehicle (and its rear-side light signals) based on the position of the bounding box in consecutive images.

The vehicle light classification system 170 (e.g., classification module 240) can obtain difference images between successive images (e.g., from image data 250) aligned based on their respective semantic keypoints. That is, to create each difference image the classification module 240 can align consecutive images (e.g., according to the positions of the semantic keypoints that correspond to a rear-side light signals) and determine a difference image between the two, with a difference image being defined as the sum of the absolute difference at each pixel.

Figure 6:
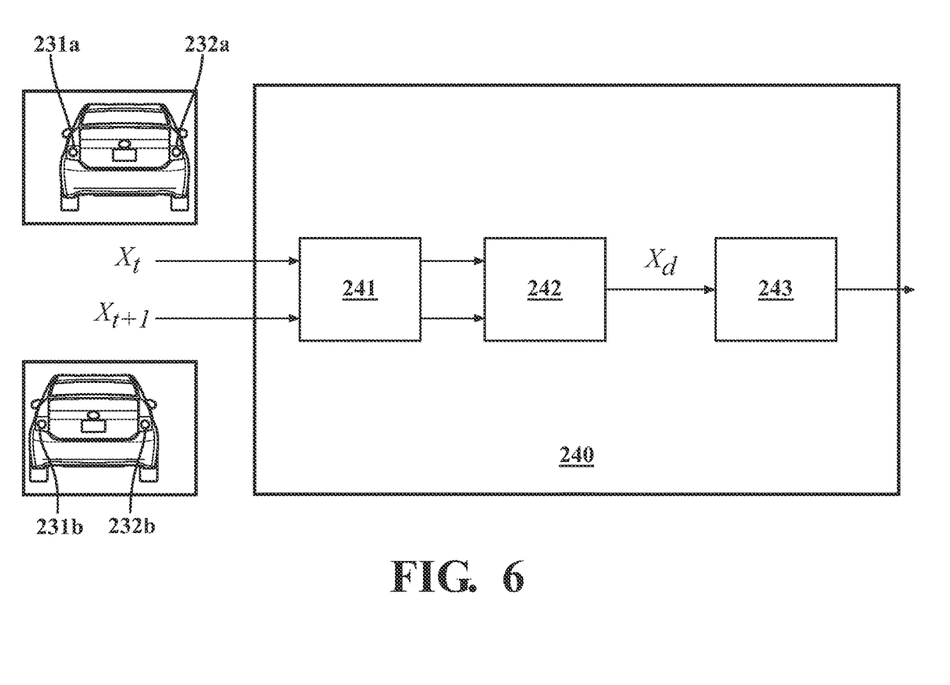
FIG. 6 illustrates an example implementation of a classification module, according to the disclosed subject matter.

FIG. 6 shows a processing example implementation of the classification module 240 according to the disclosed embodiments. The classification module 240 receives two consecutive images, $X_t$ and $X_{t+1}$, and their associated semantic keypoint data (e.g., semantic keypoints 231a, 232a, 231b, and 232b). The semantic keypoint data indicate locations of rear-side light signals in the images. At 241 the classification module 240 aligns the images (e.g., based on the semantic keypoint positions in each image) and adjusts at least one of the images to fit the other image and thereby compensate for alignment differences. In one or more embodiments, the classification module 240 adjusts the at least one image by warping the at least one image to fit the other image.

At 242 the classification module 240 obtains a difference image $X_d$ from the two images. At 243 the classification module 240 inputs the difference image into a deep neural network to classify the rear-side light signal. In one or more embodiments, the classification module 240 implements the deep neural network as including a convolutional neural network (CNN) layer that generates feature vectors based on the difference images and a long short-term memory (LSTM) layer that generates a classification based on the feature vectors. In one or more embodiments, the classification indicates an activation state of the rear-side light signal, for example, brake lights are activated, left turn signal is activated, etc.

Accordingly, the vehicle light classification system 170 can provide an output classification for a rear-side light signal based on a captured sequence of images. The vehicle light classification system 170 can output the classification to another system of the vehicle 100, such as an autonomous driving module 160, driver assist system, or other system.

Figure 7:
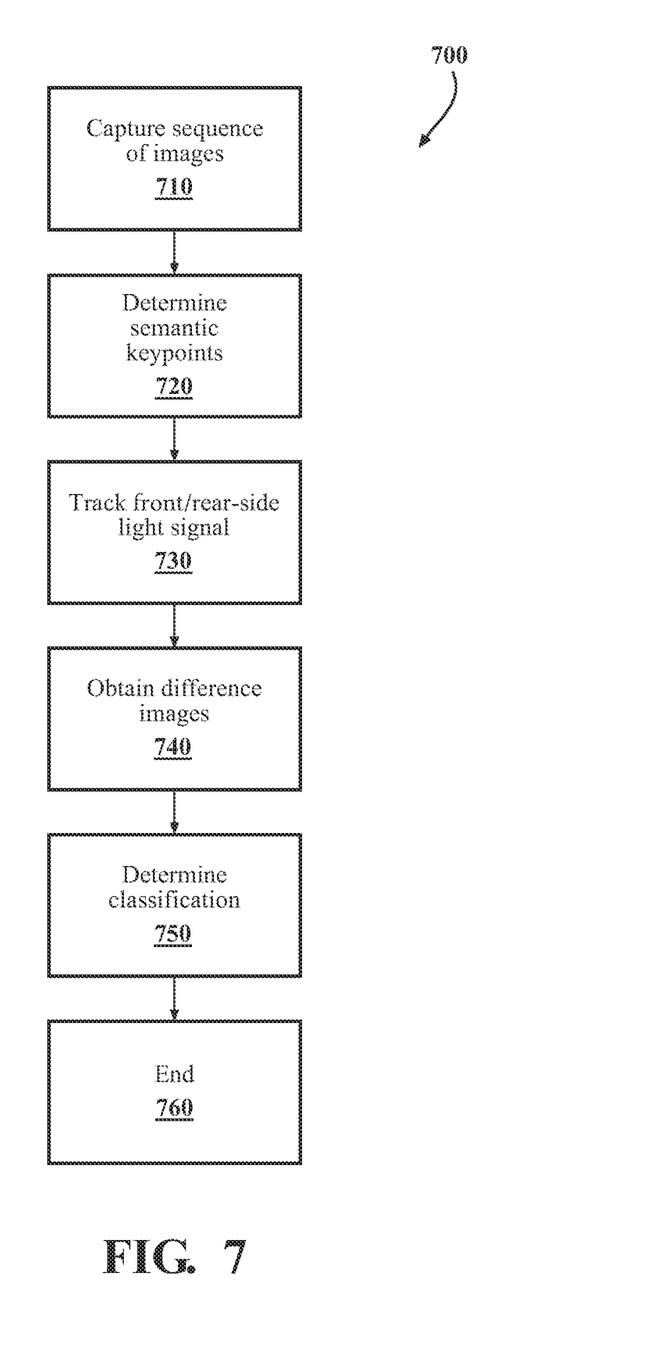
FIG. 7 illustrates a flowchart of a method of classifying a vehicle rear-side light based, according to the disclosed subject matter.

Additional and optional features of the vehicle light classification system 170 will now be discussed. FIG. 7 illustrates a flowchart of a method 700 of classifying a traffic light according to the disclosed embodiments. Method 700 will be discussed from the perspective of the vehicle light classification system 170 of FIGS. 1-6. While method 700 is discussed in combination with the vehicle light classification system 170, it should be appreciated that the method 700 is also not limited to being implemented within the vehicle light classification system 170 but is instead one example of a system that may implement the method 700. It should also be appreciated that in one or more embodiments the system 170 can be modified and applied to identifying and classifying front-side lights of a trailing vehicle, as previously mentioned.

At operation 710, the vehicle light classification system 170 (e.g., camera 126) captures a sequence of images of a scene in a vicinity of the vehicle 100. The scene can include a rear view of a vehicle with rear-side lights. In one or more embodiments the sequence of images can include timestamp data.

At operation 720, the vehicle light classification system 170 (e.g., semantic keypoint module 220) can determine semantic keypoints in the images and associated with the rear-side lights, e.g., by inputting the images into a first neural network. In one or more embodiments the neural network is a CNN trained to output a confidence heatmap that indicates confidence levels of estimations of semantic keypoints and a plurality of feature vectors associated with each semantic keypoint, respectively. The feature vectors describe aspects of their associated semantic keypoints.

In one or more embodiments, the semantic keypoint module 220 selects, for each of the rear-side light signals, a semantic keypoint based on the confidence heatmap. For example, the first neural network can select a semantic keypoint that has a confidence level that exceeds a predetermined threshold. In one or more embodiments, the semantic keypoint is a pixel at a location within the image.

At operation 730, the vehicle light classification system 170 (e.g., tracking module 230) can track a set of rear-side light signals across the sequence of images. In one or more embodiments the tracking module 230 can define a bounding box for the vehicle based at least in part on the semantic keypoints and track the bounding box across the sequence of images. For example, in one or more embodiments the tracking module 230 can compare iterations of the semantic keypoints in different images by comparing their associated feature vectors. When the feature vectors similarity exceeds a predetermined threshold, the tracking module 230 determines that the iterations represent the same semantic keypoint in the different images. The tracking module 230 can define the bounding box to encompass the vehicle or a portion of the vehicle in each image, based on positions in accordance with the tracked semantic keypoints across the sequence of images. In one or more embodiments, the tracking module 230 can define separate bounding boxes for each of a plurality of vehicles based on the semantic keypoints and track each separate bounding box across the sequence of images.

At operation 740, the vehicle light classification system 170 (e.g., classification module 240) can obtain difference images that are each a difference between successive images from among the sequence of images. In one or more embodiments, the classification module 240 can align two consecutive images based on their respective semantic keypoints. For example, the classification module 240 can position a first image over a second image such that iterations of the semantic keypoints associated with the same rear-side lights are aligned. The classification module 240 can adjust or warp one of the images to fit the other image. The classification module 240 can obtain a difference image defined as the sum of the absolute difference at each pixel in the two images. In one or more embodiments, the classification module 240 can obtain the difference images based on portions of the images that fall within as a bounding box as defined and tracked across the sequence of images by the tracking module 230.

At operation 750, the vehicle light classification system 170 (e.g., classification module 240) can determine a classification for the rear-side light signal based at least in part on the difference image. In one or more embodiments, the classification module 240 can input the difference image into a second neural network, which outputs a second classification state for the rear-side light signal. In one or more embodiments, the second neural network includes a convolutional neural network (CNN) layer that generates feature vectors based on the difference images and a long short-term memory (LSTM) layer that generates the classification based at least in part on the feature vectors. The classification can indicate an activation state for the rear-side light signal, such as 'activate brake light' or 'right turn signal.' The process ends at 760.

Embodiments disclosed herein can be implemented in any type of vehicle or system that may be required to classify a light signal of a preceding vehicle (or trailing vehicle, multiple preceding vehicles, multiple trailing vehicles, etc.). FIG. 1, which shows various components of the vehicle 100, will now be discussed in full detail as an example environment within which the system and methods disclosed herein may operate.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

In some instances, the vehicle 100 is configured to switch selectively between an autonomous mode, one or more semi-autonomous operational modes, and/or a manual mode. Such switching can be implemented in a suitable manner, now known or later developed. "Manual mode" means that all or a majority of the navigation and/or maneuvering of the vehicle is performed according to inputs received from a user (e.g., human driver). In one or more arrangements, the vehicle 100 can be a conventional vehicle that is configured to operate in only a manual mode.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can implement the database 119 and can further include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

As noted above, the vehicle 100 can include the sensor system 120. The sensor system 120 can include one or more sensors, for example, that can be powered by the disclosed vehicle light classification system 170. "Sensor," as used herein, means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself, such as one or more actual states of the vehicle 100 as discussed above. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126, e.g., one or more monocular cameras. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger).

The vehicle 100 can include an output system 135. An "output system" includes any device, component, or arrangement or groups thereof that enable information/data to be presented to a vehicle passenger (e.g., a person, a vehicle passenger, etc.). The output system 135 can function as part of an interface that can present, for example, forecast notifications as described above.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed. One or more of these systems can by operably connected to wheels of the vehicle in a manner that allows individual application of control or commands implemented by the respective system.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the vehicle light classification system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140 and, thus, may be partially or fully autonomous.

The processor(s) 110 and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the disclosed vehicle light classification system 170, the sensor system 120, and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s) and determine current autonomous driving maneuvers for the vehicle 100, future autonomous driving maneuvers and/or modifications to current autonomous driving maneuvers based on data acquired by the disclosed vehicle light classification system 170, the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vehicle light classification system, comprising:
a processor; and
a memory communicably coupled to the processor and storing:
  a semantic keypoint module including instructions that when executed by the processor cause the processor to: 1) receive, from an image capture device, a sequence of images of a scene that includes a view of a vehicle with lights, and 2) determine, based on inputting the images into a first neural network, both semantic keypoints, in the images and associated with the lights, and classifications for the semantic keypoints wherein a semantic keypoint, of the semantic keypoints, corresponds to a single pixel near a center and away from an edge of an object in an image of the images and the first neural network is a deep neural network; and
  a classification module including instructions that when executed by the processor cause the processor to: 1) obtain difference images that are each a difference between successive images from among the sequence of images, the successive images being aligned based on their respective semantic keypoints, and 2) determine a classification of the lights based at least in part on the difference images by inputting the difference images into a second neural network that generates a feature vector.

2. The vehicle light classification system of claim 1, wherein the classification module further includes instructions that cause the processor to obtain the difference images by modifying, for each difference image, a first image by warping the first image to align iterations of the semantic keypoints across the first image and a successive image, and obtaining a difference between the first image as modified and the successive image.

3. The vehicle light classification system of claim 1, wherein the second neural network includes a convolutional neural network layer configured to generate feature vectors based on the difference images and a long short-term memory layer configured to generate the classification based at least in part on the feature vectors.

4. The vehicle light classification system of claim 1, further comprising a tracking module including instructions that when executed by the processor cause the processor to define a bounding box for the vehicle based on the semantic keypoints and track the bounding box across the sequence of images.

5. The vehicle light classification system of claim 4, wherein the classification module further includes instructions that cause the processor to obtain the difference images based on portions of the images that fall within the bounding box as tracked across the sequence of images.

6. The vehicle light classification system of claim 4, wherein the scene includes a plurality of vehicles and the instructions to define the bounding box include instructions to define separate bounding boxes for each of the plurality of vehicles based on the semantic keypoints and the instructions to track the bounding box include instructions to track each separate bounding box across the sequence of images.

7. The vehicle light classification system of claim 4, wherein the instructions to track the bounding box include instructions to compare feature vectors of images in the sequence of images.

8. The vehicle light classification system of claim 1, wherein the first neural network is configured to output confidence heatmaps that indicate a confidence level of a classification state for the semantic keypoint of the semantic keypoints.

9. The vehicle light classification system of claim 1, wherein the instructions to determine the semantic keypoints include instructions to select the semantic keypoint that has a confidence level that exceeds a predetermined threshold.

10. A method of classifying vehicle lights, comprising:
capturing a sequence of images of a scene that includes a rear view of a vehicle with lights;
determining, based on inputting the images into a first neural network, both semantic keypoints, in the images and associated with the lights, and classifications for the semantic keypoints, wherein a semantic keypoint, of the semantic keypoints, corresponds to a single pixel near a center and away from an edge of an object in an image of the images and the first neural network is a deep neural network;
obtaining difference images that are each a difference between successive images from among the sequence of images, the successive images being aligned based on their respective semantic keypoints; and determining a classification of the lights based at least in part on the difference images by inputting the difference images into a second neural network that generates a feature vector.

11. The method of claim 10, wherein the obtaining the difference images comprises:
modifying a first image by warping the first image to align iterations of the semantic keypoints across the first image and a successive image; and
obtaining a difference between the first image as modified and the successive image.

12. The method of claim 10, wherein the second neural network includes a convolutional neural network layer configured to generate feature vectors based on the difference images and a long short-term memory layer configured to generate the classification based at least in part on the feature vectors.

13. The method of claim 10, further comprising:
defining a bounding box for the vehicle based on the semantic keypoints; and
tracking the bounding box across the sequence of images.

14. The method of claim 13, further comprising obtaining the difference images based on portions of the images that fall within the bounding box as tracked across the sequence of images.

15. The method of claim 13, wherein:
the scene includes a plurality of vehicles,
the defining the bounding box includes defining separate bounding boxes for each of the plurality of vehicles based on the semantic keypoints, and
the tracking the bounding box includes tracking each separate bounding box across the sequence of images.

16. A non-transitory computer-readable medium for classifying vehicle lights; including instructions that, when executed by one or more processors, cause the one or more processors to:
capture a sequence of images of a scene that includes a front/rear view of a vehicle with lights;
determine, based on inputting the images into a first neural network, both semantic keypoints, in the images and associated with the lights, and classifications for the semantic keypoints, wherein a semantic keypoint, of the semantic keypoints, corresponds to a single pixel near a center and away from an edge of an object in an image of the images and the first neural network is a deep neural network;
obtain difference images that are each a difference between successive images from among the sequence of images, the successive images being aligned based on their respective semantic keypoints; and
determine a classification of the lights based at least in part on the difference images by inputting the difference images into a second neural network that generates a feature vector.

17. The non-transitory computer-readable medium of claim 16, wherein the instructions to obtain the difference images include instructions to obtain the difference images by:
modifying a first image by warping the first image to align iterations of the semantic keypoints across the first image and a successive image; and
obtaining a difference between the first image as modified and the successive image.

18. The non-transitory computer-readable medium of claim 16, wherein the second neural network includes a convolutional neural network layer configured to generate feature vectors based on the difference images and a long short-term memory layer configured to generate the classification based at least in part on the feature vectors.

19. The non-transitory computer-readable medium of claim 16, further comprising instructions to:
define a bounding box for the vehicle based on the semantic keypoints; and
track the bounding box across the sequence of images.

20. The non-transitory computer-readable medium of claim 19, further comprising instructions to:
obtain the difference images based on portions of the images that fall within the bounding box as tracked across the sequence of images.

* * * * *